United States Patent
Hsu et al.

(10) Patent No.: US 8,525,951 B2
(45) Date of Patent: Sep. 3, 2013

(54) MULTI-VIEW LIQUID CRYSTAL DISPLAY AND THE DRIVING METHOD THEREOF

(75) Inventors: Shih-Chia Hsu, Kaohsiung (TW); Chih-Jen Hu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 145 days.

(21) Appl. No.: 13/180,849

(22) Filed: Jul. 12, 2011

(65) Prior Publication Data

US 2011/0267558 A1 Nov. 3, 2011

Related U.S. Application Data

(62) Division of application No. 12/220,860, filed on Jul. 28, 2008, now Pat. No. 8,013,951.

(30) Foreign Application Priority Data

Apr. 8, 2008 (TW) .............................. 97112689 A

(51) Int. Cl.
G02F 1/1335 (2006.01)
(52) U.S. Cl.
USPC .............................................. 349/68; 349/61
(58) Field of Classification Search
None
See application file for complete search history.

(56) References Cited

U.S. PATENT DOCUMENTS

| | | | |
|---|---|---|---|
| 5,897,184 A | 4/1999 | Eichenlaub et al. | |
| 6,606,133 B1 | 8/2003 | Okabe | |
| 7,327,929 B2 | 2/2008 | Chien et al. | |
| 2006/0164862 A1 | 7/2006 | Chien et al. | |
| 2007/0013624 A1* | 1/2007 | Bourhill | 345/84 |

FOREIGN PATENT DOCUMENTS

TW 200626992 8/2006

OTHER PUBLICATIONS

"Office Action of Taiwan Counterpart Application", issued on Feb. 15, 2012, p. 1-p. 7.

* cited by examiner

*Primary Examiner* — Tina Wong
(74) *Attorney, Agent, or Firm* — J.C. Patents

(57) ABSTRACT

A multi-view liquid crystal display for different users to watch different images from different viewing angles is provided. The multi-view liquid crystal display includes a liquid crystal display panel, a first backlight module and a second backlight module. The first backlight module is disposed below the liquid crystal display panel. The second backlight module is disposed between the first backlight module and the liquid crystal display panel. Furthermore, the first backlight module provides a first plane light source and the second backlight module provides a second plane light source. An included angle α formed between transmitting directions of the first and the second plane light sources ranges from 6 degrees to 176 degrees. Therefore, when different users watch the multi-view liquid crystal display which displays different images from different viewing angles, the resolutions of the images are the same as the resolution of the multi-view liquid crystal display panel.

12 Claims, 3 Drawing Sheets

MULTI-VIEW LIQUID CRYSTAL DISPLAY AND THE DRIVING METHOD THEREOF

CROSS-REFERENCE TO RELATED APPLICATION

This application is a divisional of and claims the priority benefit of U.S. application Ser. No. 12/220,860, filed on Jul. 28, 2008, which claims the priority benefit of Taiwan application serial no. 97112689, filed on Apr. 8, 2008. The entirety of each of the above-mentioned patent applications is hereby incorporated by reference herein and made a part of this specification.

BACKGROUND OF THE INVENTION

1. Field of the Invention

The present invention relates to a liquid crystal display and a driving method thereof, and particularly relates to a multi-view liquid crystal display and a driving method thereof.

2. Description of Related Art

With the advancement of technology, display devices have helped increase the convenience of modern life. Flat Panel Displays (FPDs) are the main stream for its lightness and thinness, with Liquid Crystal Display (LCD) being the most popular. However, in order for users to be able to view display images of the display devices from different viewing angles, a multi-view LCD is developed.

In general, the multi-view LCD is achieved by disposing a barrier, a lenticular plate, or a prism. The multi-view effect can be achieved by disposing the barrier on the exterior of an upper polarizing plate and using the barrier to control transmitting directions of backlight sources. Also, the multi-view effect can be achieved by disposing the lenticular plate or the prism in a backlight module and using the lenticular plate or the prism to control transmitting directions of backlight sources. It matters not which of the barrier, the lenticular plate, or the prism is used to control the transmitting directions of the backlight sources, users will only see images whose resolution is only half of that of the LCD panel. The images that users see are not good enough.

SUMMARY OF THE INVENTION

The present invention provides a multi-view LCD which enables different users to view different images from different viewing angles. The resolutions of these images are the same as the real resolution of the LCD panel of the multi-view LCD.

The present invention provides a driving method suitable for driving a multi-view LCD. The driving method ensures that the resolutions of the images displayed by the multi-view LCD from various viewing angles do not decrease.

The present invention provides a driving method for a multi-view LCD suitable for driving a multi-view LCD. The method ensures that the resolutions of the images displayed by the multi-view LCD from different viewing angles are the same and the resolutions of these images do not decrease.

The present invention provides a multi-view LCD enabling different users to view different images from different viewing angles. The multi-view LCD comprises an LCD panel, a first backlight module, and a second backlight module. The first backlight module is disposed below the LCD panel. The second backlight module is disposed between the first backlight module and the LCD panel. Furthermore, the first backlight module provides a first plane light source and the second backlight module provides a second plane light source. An included angle $\alpha$ formed between the transmitting directions of the first and the second plane light sources ranges from 6 degrees to 176 degrees.

In one embodiment of the present invention, the above LCD panel comprises a transmissive LCD panel or a transflective LCD panel.

In one embodiment of the present invention, the above first backlight module or the second backlight module comprises a direct type backlight module or an edge type backlight module.

In one embodiment of the present invention, the above LCD panel comprises a normal vector. The transmitting direction of the first plane light source forms an included angle $\alpha 1$ with the normal vector, and the transmitting direction of the second plane light source forms an included angle $\alpha 2$ with the normal vector.

In one embodiment of the present invention, $\alpha 1 = \alpha 2$ and, $\alpha 1$ and $\alpha 2$ are approximately in the range from 3 degrees to 88 degrees. In another embodiment, $\alpha 1 \neq \alpha 2$ and, $\alpha 1$ and $\alpha 2$ are approximately in the range from 3 degrees to 88 degrees.

In one embodiment of the present invention, a normal vector, a transmitting direction of a first plane light source, and a transmitting direction of a second plane light source are on the same plane.

The present invention provides another multi-view LCD which comprises an LCD panel, a first backlight module, and a second backlight module. The first backlight module is disposed below the LCD panel. The second backlight module is disposed between the first backlight module and the LCD panel. Furthermore, the first backlight module provides a first plane light source and the second backlight module provides a second plane light source to the LCD panel to respectively display a first program image and a second program image independent from the first program image at the same time.

In one embodiment of the present invention, an included angle $\alpha$ formed between the transmitting directions of the first and the second plane light sources ranges from 6 degrees to 176 degrees.

In one embodiment of the present invention, a first backlight module and a second backlight module are turned on alternately.

In one embodiment of the present invention, an LCD panel has a normal vector. A transmitting direction of a first plane light source forms an included angle $\alpha 1$ with the normal vector, and a transmitting direction of a second plane light source forms an included angle $\alpha 2$ with the normal vector. In one embodiment of the present invention, $\alpha 1 = \alpha 2$ and, $\alpha 1$ and $\alpha 2$ are approximately in the range from 3 degrees to 88 degrees. In another embodiment, $\alpha 1 \neq \alpha 2$ and, $\alpha 1$ and $\alpha 2$ are approximately in the range from 3 degrees to 88 degrees.

The present invention provides a driving method suitable for driving a multi-view LCD which enables different users to view different images from different viewing angles. The multi-view LCD comprises an LCD panel, a first backlight module, and a second backlight module. The first backlight module is disposed below the LCD panel. The second backlight module is disposed between the first backlight module and the LCD panel. Furthermore, the first backlight module provides a first plane light source and the second backlight module provides a second plane light source. An included angle $\alpha$ formed between the transmitting directions of the first and the second plane light sources ranges from 6 degrees to 176 degrees. In addition, the driving method comprises alternately turning on the first backlight module and the second backlight module and alternately displaying a first program image and a second program image through the LCD panel. The turn-on time of the first backlight module corresponds to the time when the first program image is provided and the turn-on time of the second backlight module corresponds to the time when the second program image is provided.

In one embodiment of the present invention, a brightness of a first plane light source provided by a first backlight module is substantially equal to a brightness of a second plane light source provided by a second backlight module. In another embodiment, a brightness of a first plane light source provided by a first backlight module is not equal to a brightness of a second plane light source provided by a second backlight module.

In one embodiment of the present invention, the turn-on time of the first backlight module and the turn-on time of the second backlight module are substantially the same in the same frame time in the above driving method.

The present invention provides a method for driving a multi-view LCD. The multi-view LCD comprises an LCD panel, a first backlight module, and a second backlight module. The first backlight module is disposed below the LCD panel. The second backlight module is disposed between the first backlight module and the LCD panel. Furthermore, the first backlight module provides a first plane light source and the second backlight module provides a second plane light source to the LCD panel. Furthermore, the driving method for driving the multi-view LCD comprises providing the multi-view LCD, alternately turning on the first backlight module and the second backlight module, and alternately displaying a first program image and a second program image through the LCD panel. The first program image and the second program image are completely independent from each other at the same time.

In one embodiment of the present invention, a brightness of a first plane light source provided by a first backlight module is substantially equal to that of a second plane light source provided by a second backlight module. In another embodiment, a brightness of a first plane light source provided by a first backlight module is not equal to that of a second plane light source provided by a second backlight module.

In one embodiment of the present invention, a time difference between a turn-on time of a first backlight module and a turn-off time of a second backlight module within a frame time that a first program image and a second program image overlap is larger than about 0 ms and smaller than or equal to about 8.3 ms. In another embodiment, a time difference between a turn-on time of a first backlight module and a turn-off time of a second backlight module is larger than about 0 ms and smaller than or equal to about 1 ms.

The multi-view LCD display of the present invention uses a structure comprising a first backlight module, a second backlight module, and an LCD panel to alternately display a first program image and a second program image such that when the first backlight module is turned on, the LCD panel displays the first program image and when the second backlight module is turned on, the LCD panel displays the second program image. Thus, the resolutions of images that different users see from different viewing angles are the same as the real resolution of the multi-view LCD display.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
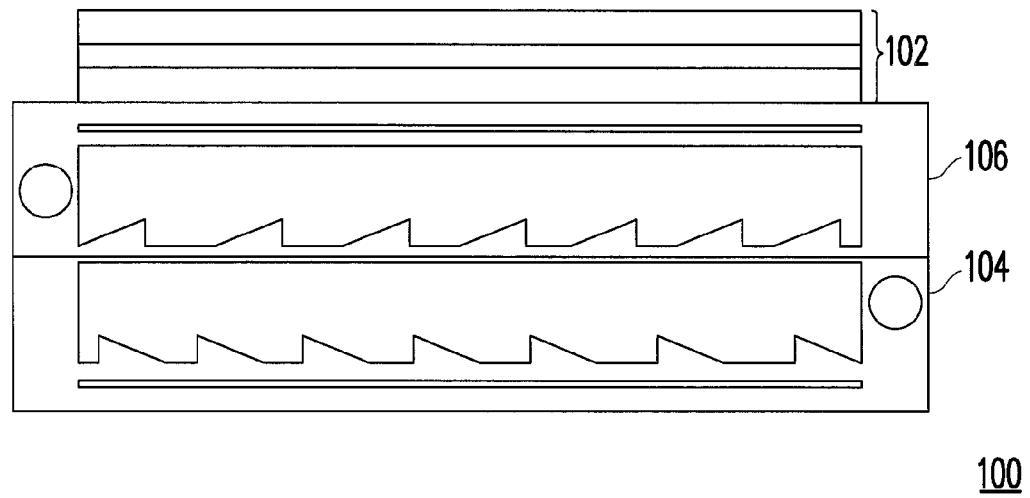
FIG. 1 is a structural view of a multi-view LCD according to one embodiment of the present invention.

FIG. 1 is a structural view of a multi-view LCD according to one embodiment of the present invention. Referring to FIG. 1, the present invention provides a multi-view LCD 100 which enables different users to view different images from different viewing angles. As shown in FIG. 1, the multi-view LCD 100 comprises an LCD panel 102, a first backlight module 104, and a second backlight module 106. The first backlight module 104 is disposed below the LCD panel 102. The second backlight module 106 is disposed between the first backlight module 104 and the LCD panel 102.

Figure 2:
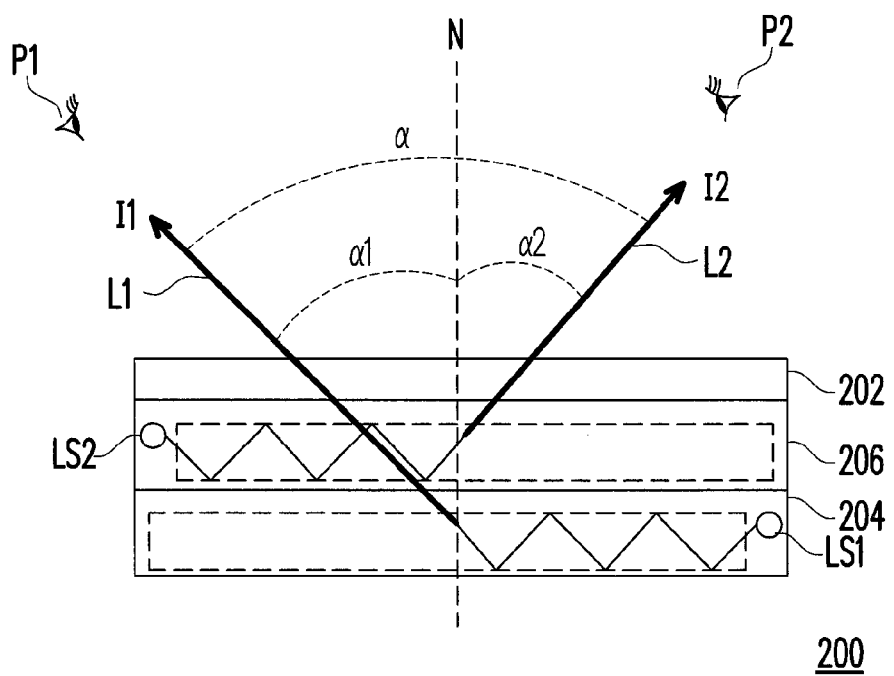
FIG. 2 is a schematic view of the multi-view LCD in FIG. 1.

FIG. 2 is a schematic view of the multi-view LCD in FIG. 1. Referring to FIG. 2, a multi-view LCD 200 comprises an LCD panel 202, a first backlight module 204, and a second backlight module 206. In general, the LCD panel 202 relies on the first backlight module 204 and the second backlight module 206 to provide the main backlight source. Therefore, the LCD panel 202 at least has transmissive pixels. For example, the LCD panel 202 may be a transmissive LCD panel or a transflective LCD panel. In the present embodiment, the first backlight module 204 and the second backlight module 206 are both edge type backlight modules and the LCD panel 202 is a transmissive LCD panel, for example. The first backlight module 204 comprises a first light source LS1 and a first light conducting substrate (not shown). The second backlight module 206 comprises a second light source LS2 and a second light conducting substrate (not shown).

Figure 5A:
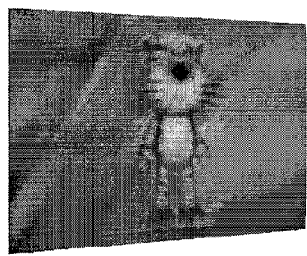
FIG. 5a is an image picture viewed from a left side of an LCD panel from a non-right angle in one embodiment of the present invention.
Figure 5B:
FIG. 5b is an image picture viewed from a right angle to an LCD panel in one embodiment of the present invention.
Figure 5C:
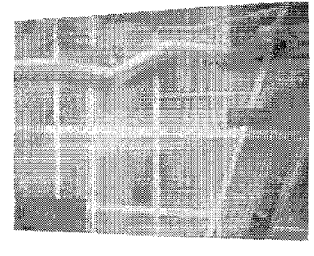
FIG. 5c is an image picture viewed from a right side of an LCD panel from a non-right angle in one embodiment of the present invention.

Specifically, FIG. 5a~FIG. 5c are display images on the LCD panel from three viewing angles in one embodiment of the present invention. When the first backlight module 204 is turned on, the second backlight module 206 is off. At this time, only the first light source LS1 forms a first plane light source L1 through the light conducting substrate (not shown) in the first backlight module 204. Thus, the first backlight module 204 may provide the first plane light source L1 to the LCD panel 202. At the same time, the LCD panel 202 provides a first program image I1 which is navigation information as shown in FIG. 5c, for example. This view is from the right side of the LCD panel 202 in a non-right angle and is the view from the position of the user P1.

For the same reason, when the second backlight module 206 is on and the first backlight module 204 is off, the second light source LS2 forms a second plane light source L2 through the light conducting substrate (not shown) in the second backlight module 206. Thus, the second backlight module 206 may provide the second plane light source L2 to the LCD panel 202. At the same time, the LCD panel 202 provides a second program image I2 which is a cartoon program as shown in FIG. 5a, for example. This view is from the left side of the LCD panel 202 in a non-right angle and is the view from the position of the user P2.

It should be noted that FIG. 5b is a view of the LCD panel from a right angle and is an overlapping image of the views from the right and left sides of the LCD panel by the users P1 and P2.

In light of the above, the user P1 is on the transmitting direction of the first light plane light source L1 so the user P1 sees that the image displayed on the multi-view LCD 200 is the first program image I1. Similarly, when the user P2 is on the transmitting direction of the second light plane light source L2, the user P2 sees the second program image I2. It should be noted that the transmitting directions of the first plane light source L1 and the second plane light source L2 form an included angle $\alpha$ where a ranges from 6 degrees to 176 degrees.

Referring to FIG. 2, the first backlight module 204 and the second backlight module 206 provide a first plane light source L1 and a second plane light source L2, respectively, to the LCD panel 202. Therefore, the LCD panel 202 may display the first program image I1 and the second program image I2 which is independent from the first program image I1 at the same time. In other words, the first program image I1 viewed by the user P1 and the second program image I2 viewed by the user P2 are completely different and not related.

If the multi-view LCD 200 in the present embodiment is used in a system inside an automobile, from the position of the driver (i.e. the user P1), the first program image I1 (i.e. navigation information) may be viewed. When the automobile is on the road, it may reach its destination according to the content of the first program image I1 while from the position of the passenger (i.e. the user P2), the second program image I2 (i.e. cartoon or other entertainment programs) may be viewed. Furthermore, the contents of the first program image I1 and the second program image I2 may be adjusted accordingly. In other words, the second program image I2 may be navigation information. The present invention is not limited hereby.

What is more special is that when the user P1 and the user P2 view images that are the first program image I1 and the second program image I2, respectively, the resolutions of the first program image I1 and the second program image I2 are the same as the resolution of the LCD panel 202.

In addition, the distance between the first backlight module 204 and the LCD panel 202 is longer than the distance between the second backlight module 206 and the LCD panel 202 so if the brightness of the first light source LS1 is the same as the brightness of the second light source LS2, the image that the user P1 sees displayed by the multi-view LCD 200 is darker than the image that the user P2 sees displayed by the multi-view LCD 200. In order for the user P1 and the user P2 to see images of the same brightness, the brightness of the first plane light source L1 provided by the first backlight module 204 may substantially equal to the brightness of the second plane light source L2 provided by the second backlight module 206.

However, those skilled in the art may also set the images viewed by the user P1 and the user P2 to be at different brightness. Thus, the brightness of the first plane light source L1 provided by the first backlight module 204 may substantially not equal to the brightness of the second plane light source L2 provided by the second backlight module 206.

Certainly, in other embodiments, designers may design the first backlight module 204 or the second backlight module 206 as a direct type backlight module. Furthermore, the first backlight module 204 and the second backlight module 206 may be any type that respectively provides light surface sources of different angles. The present invention does not limit the type of the first backlight module 204 or the second backlight module 206.

It should be noted that the LCD panel 200 comprises a normal vector N. The transmitting direction of the first plane light source L1 forms an included angle $\alpha 1$ with the normal vector N, and the transmitting direction of the second plane light source L2 forms an included angle $\alpha 2$ with the normal vector N. Therefore, the directions from which the user P1 and the user P2 view the multi-view LCD 200 form angles $\alpha 1$ and $\alpha 2$, respectively, with the normal vector N. Furthermore, the normal vector N, the transmitting direction of the first plane light source L1, and the transmitting direction of the second plane light source L2 are on the same plane.

What is special is that in one embodiment, when $\alpha 1$ and $\alpha 2$ are equal and both in the range of 3 degrees to 88 degrees, the user P1 and the user P2 will be able to view better display images on the multi-view LCD 200 at angles $\alpha 1$ and $\alpha 2$, respectively.

However, in another embodiment, when $\alpha 1$ and $\alpha 2$ are not equal and are both in the range of 3 degrees to 88 degrees, the user P1 and the user P2 may also be able to view better display images on the multi-view LCD 200 at angles $\alpha 1$ and $\alpha 2$, respectively.

Figure 3:
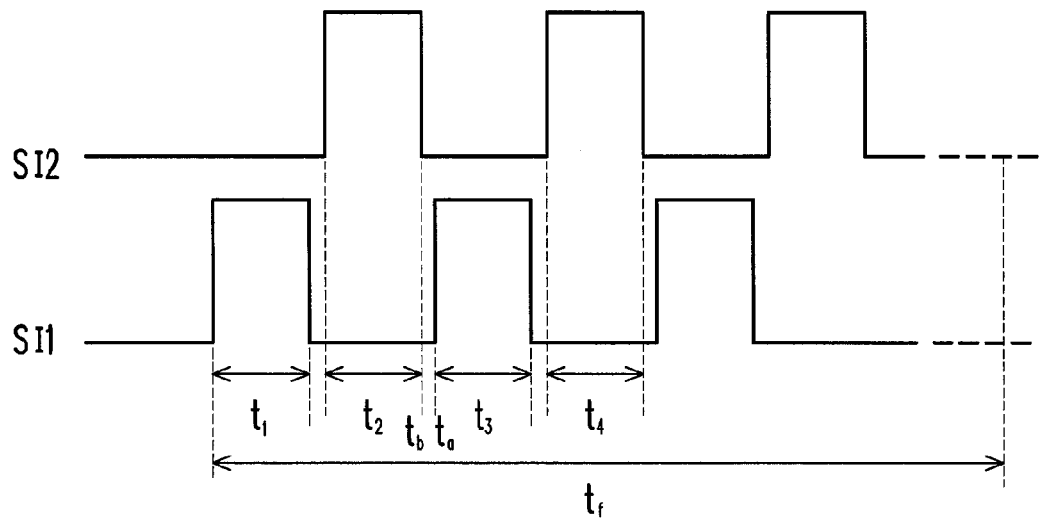
FIG. 3 is a waveform diagram of image signals received by an LCD panel of a multi-view LCD in one embodiment of the present invention.

In practice, a driving circuit in the multi-view LCD 200 (not shown) may make the LCD panel 202 alternately display the first program image I1 and the second program image I2. FIG. 3 is a waveform diagram of image signals received by the LCD panel of the multi-view LCD in one embodiment of the present invention. Referring to FIG. 2 and FIG. 3 at the same time, from the waveform diagram, the LCD panel 202 alternately receives a first image signal SI1 and a second image signal SI2. Specifically, the time period t1 that the LCD panel 202 receives the first image signal SI1 corresponds to the turn-on time of the first backlight module 204, during which the user P1 may view the first program image I1. In another aspect, the time period t2 that the LCD panel 202 receives the second image signal SI2 corresponds to the turn-on time of the second backlight module 206, during which the user P2 may view the second program image I2.

Similarly, the method of transmitting images in time period t1 may be applicable in time periods t3 etc. . . . and the method of transmitting images in time period t2 may be applicable in time periods t4 etc. . . . . . In other words, the first program images I1 generated in time periods t1, t3, . . . have a closer relationship, while the second program images I2 generated in time periods t2, t4, . . . have a closer relationship. The first program image I1 and the second program image I2 are generated alternately. Therefore, the LCD 200 alternately displays the first program image I1 and the second program image I2.

From the above, the user P1 is in the transmitting direction of the first plane light source L1 so the user P1 only sees the first program image I1 when viewing the multi-view LCD 200. For the same reason, the user P2 only sees the second program image I2. The fact that the LCD panel 202 alternately receives the image signals SI1 and SI2 makes the user P1 and the user P2 alternately view the first program image I1 and the second program image I2. However, the vision reaction speeds of the user P1 and the user P2 are lower than the switching speed between the first image signal SI1 and the second image signal SI2 so the first program image I1 viewed by the user P1 and the second program image I2 viewed by the user P2 are serial display images.

It should be mentioned that in a same frame time $t_f$, the turn-on time of the first backlight module 204 (e.g. $t_1, t_3 \ldots$) and the turn-on time of the second backlight module 206 (e.g. $t_2, t_4 \ldots$) may substantially be equal. However, those skilled in the art may design a turn-on time of the first backlight module 204 to be different from the turn-on time of the second backlight module 206, according to design requirements.

Referring to FIG. 3 again, a time difference between the turn-on time of the first backlight module 204 (e.g. $t_a$) and the turn-off time of the second backlight module 206 (e.g. $t_b$) within a frame time $t_f$ that the first program image I1 and the second program image I2 overlap is approximately larger than 0 ms and smaller than or equal to 8.3 ms. Take an Optically Compensated Birefringence Liquid Crystal Display (OCB LCD) for example, the time difference between the turn-on time of the first backlight module 204 (e.g. $t_a$) and the turn-off time of the second backlight module 206 (e.g. $t_b$) is approximately larger than 0 ms and smaller than or equal to 1 ms.

Figure 4:
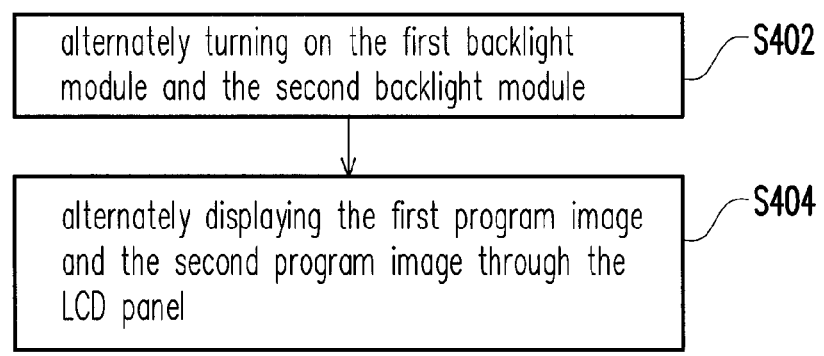
FIG. 4 is a flow chart illustrating a driving method according to another embodiment of the present invention.

The above FIG. 1 and FIG. 2 showing the structure of the multi-view LCD 200 may be used to further illustrate the multi-view LCD 200 in connection with the driving method in FIG. 4. FIG. 4 is a flow chart illustrating a driving method in one embodiment of the present invention. The driving method is suitable for driving the multi-view LCD 100 and the multi-view LCD 200 (shown in FIG. 1 and FIG. 2). Referring to FIG. 4, the driving method comprises the following steps. First, provide the multi-view LCD 200 which comprises an LCD panel 202, a first backlight module 204 and a second backlight module 206 as shown in FIG. 1 or FIG. 2, wherein the first backlight module 204 provides a first plane light source L1 and the second backlight module 206 provides a second plane light source L2 to the LCD panel 202, and then, in step S402, a multi-view LCD alternately turns on a first backlight module and a second backlight module. In step S404, the multi-view LCD alternately displays a first program image I1 and a second program image I2 through an LCD panel. The turn-on time of the first backlight module corresponds to the time when the first program image is provided and the turn-on time of the second backlight module corresponds to the time when the second program image is provided.

Specifically, during the time when the first backlight module is turned on, the first backlight module works in connection with the LCD panel to display an image on the LCD. In another aspect, during the time when the second backlight module is turned on, the second backlight module works in connection with the LCD panel to display an image on the LCD. Other details of the present driving method have been included in the above embodiment, which will not be further explained herein.

In summary, the present invention provides a multi-view LCD which enables different users to view different images from different viewing angles. The resolutions of these images are the same as the real resolution of the LCD panel of the multi-view LCD. Thus, the multi-view LCD of the present invention provides simultaneous viewing to multiple users from multiple viewing angles without reducing resolution.

It will be apparent to those of ordinary skills in the technical field that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A multi-view liquid crystal display (LCD), comprising:
   an LCD panel, wherein a first program image and a second program image are alternately displayed through the LCD panel;
   a first backlight module disposed below the LCD panel; and
   a second backlight module disposed between the first backlight module and the LCD panel, wherein the first backlight module and the second backlight module are alternately turned on, wherein the turn-on time of the first backlight module corresponds to the time when the first program image is provided and the turn-on time of the second backlight module corresponds to the time when the second program image is provided, and wherein the first backlight module provides a first plane light source, the second backlight module provides a second plane light source, and an included angle $\alpha$ formed between the transmitting directions of the first and the second plane light sources ranges from 6 degrees to 176 degrees so that the LCD panel, the first backlight module and the second backlight module constitute the multi-view liquid crystal display suitable for different users to view different images from different viewing angles.

2. The multi-view LCD according to claim 1, wherein the LCD panel comprises a transmissive LCD panel or a transflective LCD panel, and wherein the first backlight module and the second backlight module comprise a direct type backlight module or an edge type backlight module.

3. The multi-view LCD according to claim 1, wherein the LCD panel has a normal vector, the transmitting direction of the first plane light source forms an included angle $\alpha 1$ with the normal vector, the transmitting direction of a second plane light source forms an included angle $\alpha 2$ with the normal vector, and $\alpha 1$ and $\alpha 2$ are approximately in the range from 3 degrees to 88 degrees.

4. The multi-view LCD according to claim 1, wherein the LCD panel has a normal vector, the transmitting direction of the first plane light source forms an included angle $\alpha 1$ with the normal vector, the transmitting direction of a second plane light source forms an included angle $\alpha 2$ with the normal vector, $\alpha 1 \neq \alpha 2$, $\alpha 1$ is approximately in the range from 3 degrees to 88 degrees, and $\alpha 2$ is approximately in the range from 3 degrees to 88 degrees.

5. The multi-view LCD according to claim 1, wherein the normal vector, the transmitting direction of the first plane light source, and the transmitting direction of the second plane light source are on the same plane.

6. The multi-view LCD according to claim 1, wherein the first backlight module includes a first light conducting substrate and the second backlight module includes a second light conducting substrate, the first light conducting substrate includes a plurality of first micro grooves and the second light conducting substrate includes a plurality of second micro grooves different from the first micro grooves such that the included angle $\alpha$ formed between the transmitting directions of the first and the second plane light sources ranges from 6 degrees to 176 degrees.

7. A multi-view liquid crystal display (LCD), comprising:
   an LCD panel, wherein a first program image and a second program image are alternately displayed through the LCD panel;
   a first backlight module disposed below the LCD panel; and
   a second backlight module disposed between the first backlight module and the LCD panel, wherein the first backlight module and the second backlight module are alternately turned on, wherein the turn-on time of the first backlight module corresponds to the time when the first program image is provided and the turn-on time of the second backlight module corresponds to the time when the second program image is provided, and wherein the first backlight module provides a first plane light source and the second backlight module provides a second plane light source to the LCD panel to respectively display the first program image and the second program image different from the first program image at the same time.

8. The multi-view LCD according to claim 7, wherein the transmitting direction of the first plane light source and the transmitting direction of the second plane light source form an included angle $\alpha$ in the range from 6 degrees and 176 degrees.

9. The multi-view LCD according to claim 7, wherein the first backlight module and the second backlight module are turned on alternately.

10. The multi-view LCD according to claim 7, wherein the LCD panel has a normal vector, the transmitting direction of the first plane light source forms an included angle $\alpha 1$ with the normal vector, the transmitting direction of a second plane light source forms an included angle $\alpha 2$ with the normal vector, $\alpha 1 = \alpha 2$, and $\alpha 1$ and $\alpha 2$ are approximately in the range from 3 degrees to 88 degrees.

11. The multi-view LCD according to claim 7, wherein the LCD panel has a normal vector, the transmitting direction of the first plane light source forms an included angle $\alpha 1$ with the normal vector, the transmitting direction of a second plane light source forms an included angle $\alpha 2$ with the normal vector, $\alpha 1 \neq \alpha 2$, $\alpha 1$ is approximately in the range from 3 degrees to 88 degrees, and $\alpha 2$ is approximately in the range from 3 degrees to 88 degrees.

12. The multi-view LCD according to claim 7, wherein the first backlight module includes a first light conducting substrate and the second backlight module includes a second light conducting substrate, the first light conducting substrate includes a plurality of first micro grooves and the second light conducting substrate includes a plurality of second micro grooves different from the first micro grooves such that an included angle $\alpha$ formed between the transmitting directions of the first and the second plane light sources ranges from 6 degrees to 176 degrees.

* * * * *